Figure 1:
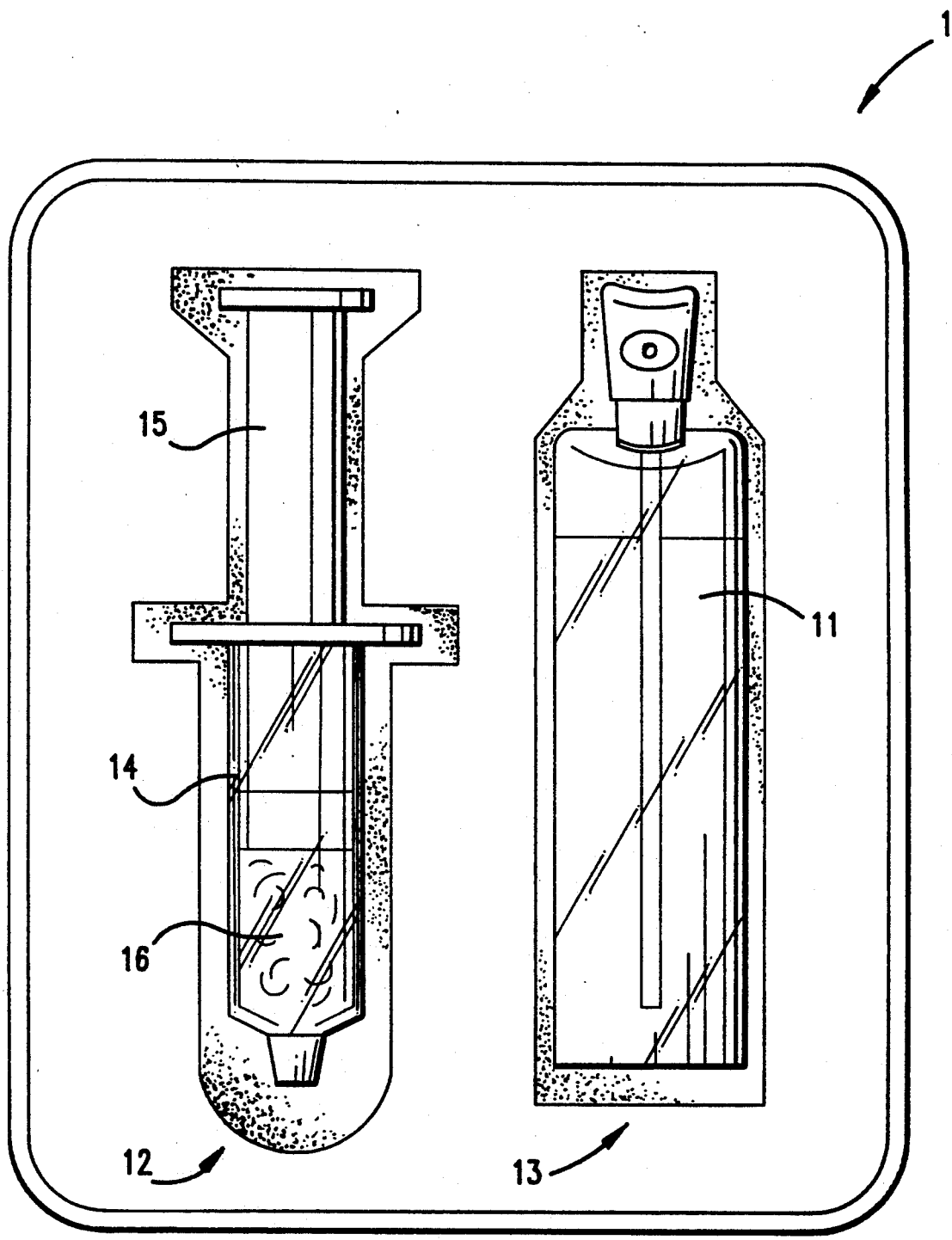

United States Patent [19]

Johnson

[11] Patent Number: 5,292,333
[45] Date of Patent: Mar. 8, 1994

[54] BIOLOGICAL TISSUE ADHESION
[75] Inventor: Robert G. Johnson, Chestnut Hill, Mass.
[73] Assignee: Beth Israel Hospital, Boston, Mass.
[21] Appl. No.: 755,523
[22] Filed: Sep. 5, 1991
[51] Int. Cl.$^5$ .................................... A61B 17/00
[52] U.S. Cl. ................................. 606/214; 424/492; 606/213; 528/905
[58] Field of Search ............. 606/213, 214; 523/118; 528/905; 527/200, 206; 424/77, 82, 488

[56] References Cited

U.S. PATENT DOCUMENTS 3,438,374  4/1969  Falb et al. ........................... 128/334

OTHER PUBLICATIONS

Edwards (1957) The Effect of Porosity in Solid Plastic Artery Grafts, Surgical Forum, vol. 8 (1958) pp. 446–450.
Weslowski et al. (1961) Porosity: Primary Determinant of Ultimate Fate of Synthetic Vascular Grafts, Surgery, vol. 50, pp. 91–96.
Bascom (1961) Gelatin Sealing to Prevent Blood Loss from Knitted Arterial Grafts, Surgery, vol. 50, pp. 504–512.
Braunwald and Awe (1962) Control of Hemorrhage from the Heart and Aorta Utilizing a Plastic Adhesive, Surgery 51(6) pp. 786–792.
Wesolowski et al. (1963) The Compound Prosthetic Vascular Graft: A Pathologic Survey, Surgery, vol. 53, pp. 19–44.
Braunwald et al. (1966) Evaluation of Crosslinked Gelatin as a Tissue Adhesive and Hemostatic Agent: An Experimental Study. Surgery 59, pp. 1024–1030.
Tatooles and Braunwald (1966) The Use of Crosslinked Gelatin as a Tissue Adhesive to Control Hemorrhage from Liver and Kidney, Surgery vol. 60, pp. 857–861.
Bonchek and Braunwald (1967) Experimental Evaluation of a Crosslinked Gelatin Adhesive in Gastrointestinal Surgery, Annals of Surgery, vol. 165, pp. 420–424.
Bonchek et al. (1967) Use of a Cross-Linked Gelatin Tissue Adhesive in Surgery of the Urinary Tract, Surgery Gynecology and Obstetrics, vol. 125, pp. 1301–1306.
Cooper and Fald (1968) Surgical Adhesives, Annals New York Academy of Science, vol. 146 (1), pp. 215–225.
Weslowski et al, (1968) Arterial Prosthetic Materials, Annals of the New York Academy of Science, vol. 146, pp. 325–345.
Lamperle et al. (1968) Ein neue Gewebeklebstoff aus Gelatine, Resorcine und Formalin. Bruns' Beitr. klin. Chir., vol. 216, pp. 553–559.

(List continued on next page.)

Primary Examiner—Stephen C. Pellegrino
Assistant Examiner—Gary Jackson
Attorney, Agent, or Firm—Bromberg & Sunstein

[57] ABSTRACT

The invention provides a method for the application of gelatin-resorcinol aldehyde glue to a surface, wherein a solution of gelatin-resorcinol is applied to the surface to obtain a gelatin-resorcinol coated surface. Subsequently, a solution of an aldehyde is aerosolized onto the gelatin-resorcinol coated surface. The mixture of gelatin-resorcinol and the aldehyde is then allowed to polymerize on the surface. The methods of the invention may be conveniently and efficiently used to apply gelatin-resorcinol aldehyde glue to high porosity vascular prostheses, either before or after implantation, to provide improved hemostasis. The aldehydes that may be utilized according to the methods of the invention may include formaldehyde, glutaraldehyde, or a combination thereof In one embodiment of the invention, the gelatin-resorcinol aldehyde glue may be conveniently provided in a kit that includes (a) a first container of a gelatin-resorcinol solution and (b) a second container of a solution of an aldehyde, the second container including means for aerosolizing the aldehyde solution. The methods of the invention may be used for the application of gelatin-resorcinol aldehyde glue in a wide variety of surgical procedures.

18 Claims, 1 Drawing Sheet

OTHER PUBLICATIONS

Matsumoto et al. (1969) Comparative study of Cyanoacrylate and Cross Linked Gelatin Compound in Hemostasis of Anticoagulated Wound, Military Medicine, vol. 134, pp. 98–103.

Koehnlein and Lemperle (1969) Experimental Studies with a New Gelatin-Resorcin-Formaldehyde Glue, Surgery, vol. 66, pp. 377–382.

Vergoz et al. (1973) Controle du Sanguinement Pathologique, La Nouvelle Presse Medicale, vol. 2, pp. 1459–1460.

Andrade et al. (1973) Water as a Biomaterial, Transactions of the American Society of Artificial Organs, vol. 19, pp. 1–7.

Auvert et al. (1975) Applications de la Colle Hemostatique G.R.F. en Chirurgie, Nouvelle Presse Medicale, vol. 4, pp. 733–734.

Gallot et al. (1976) A Simplified Bloodless Procedure for Extensive Hepatectomy, Eur. Surg Res., vol. 8, pp. 36–242.

Laurian et al. (1977) La Colle Gelatine-Resorcine-Formaldehyde en Chirurgie Vasculaire, La Nouvelle Presse Medicale, vol. 2, pp. 3222–3223.

Bachet et al. (1979) Dissection Aigue de L'aorte, Nouvelle Presse Med., vol. 8, pp. 1421–1425.

Guilemet (1979) Use of Biological Glue in Acute Aortic Dissection, J. Thoracic and Cardiovascular Surgery, vol. 77, pp. 516–521.

Barcikowski et al. (1979) Das Kleben der Pleurahohle in der Experimentellen Forschung, Z. Exper. Chirurg., vol. 12, pp. 102–106.

Vandor (1980) A Critical Study on the Preparation and Application of Gelatin-Resorcinol Tissue Adhesive Crosslinked by Formaldehyde, Z. Exper. Chirurg., vol. 13, pp. 43–51.

Bachet et al. (1983) Quatre ans D'experience Clinique de la Colle Gelatine-Resorcine-Formol dans les Dissections Aigues de L'aota Ascendante, Arch. Mal. Coeur, vol. 1, pp. 87–94.

Jarmundowicz et al. (1984) Zastosowanie Kleju Zelatynoworezorcynowo-Formaldehydowego (GRF) W Chirurgicznym Leczeniu Przetok Plynu Mozgowordzeniowego, Neur. Neurochir. pol, vol. xv111 (xxx1V), nr 3.

Guilemet (1985) Traitement Chirugical des Dissection Aigues de L'aorte, Ann de Cardiologie et D'angeiologie, vol. 34, pp. 17–20.

Jonas et al. (1986) Biological Sealants and Knitted Dacron: Porosity and Histological Comparisons of Vascular Graft Materials with and without Collagen and Fibrin Glue Pretreatments, Annals Thoracic Surgery, vol. 41, pp. 657–663.

Guidoin et al. (1987) Textile Arterial Prosthesis: Is Water Permeability Equivalent to Porosity? Journal of Biomedical Materials, vol. 21, pp. 65–87.

Guidoin et al. (1987) In Vitro and In Vivo Characterization of an Impervious Polyester Arterial Prosthesis: The Gelseal Triaxial Graft, Biomaterials, vol. 8, pp. 433–441.

Paulisti (1988) Emprego da Cola Biologica No Tratamento Cirurgico da Disseccao Aortica-Relato de Tres Casos, Arq. Bras. Cardiol., vol. 50, pp. 269–273.

Fabiani et al. (1989) Use of Surgical Glue Without Replacement in the Treatment of Type A Aortic Dissection, Supplement 1, Circulation, vol. 80, pp. 264–268.

Matsumoto et al, "Disposable Aerosol Tissue Adhesive Spray" Arch Surgery, vol. 95, pp. 685–688, Oct. 1967.

BIOLOGICAL TISSUE ADHESION

TECHNICAL FIELD

The invention relates to methods for the adhesion of biological tissue and grafts.

BACKGROUND ART

A. High Porosity Vascular Prostheses (HPVP)

The ideal specifications for vascular prostheses have been elaborated by Wesolowski and include: (1) the absence of toxicity, allergenc potential, or other overtly adverse chemical reaction, (2) durability upon prolonged implantation, (3) the biological healing porosity should be on the order of 10,000 ml of water/min. per sq cm of fabric at a pressure head of 120 mm Hg, (4) the material should have a low implant porosity to enable the administration of heparin or other anticoagulant: less than 50 cc/min/cm$^2$ at a pressure head of 120 mm Hg, (5) there should be desirable handling properties which would facilitate implantation, for example conformability for easy anastomosis, linear elasticity (allowed by crimping), pliability and good twist characteristics. Wesolowski et. al. (1968) Ann. N. Y. Acad. Sci. 146 pp. 325–344. Commercially available high porosity prostheses meet some of the above specifications but still face the problem of prohibitive leakage of blood at the time of implantation.

Porosity refers to the proportion of void space (pores) within the boundaries of a solid material, compared to its total volume Guidoin et. al. (1987) J. Biomed Materials Research 21 pp. 65–87. The importance of porosity in determining the long term performance has been emphasized Edwards, W. S. (1957) Surg. Forum 8 p. 446. This study showed the necessity for pores that will permit fibroblasts to grow into the lumen of the graft, organize the fibrin, and heal the graft in place. The porosity is believed to give a rough prediction of the capacity of the new graft to anchor newly formed surrounding tissue after implantation, i.e. the greater the porosity the better the healing Guidoin et. al. Prostheses that are woven too tightly may fail to allow ingrowth of host tissue. Wesolowski et. al. (1961) Surgery 50 p. 91.

The methods and materials that have been used to prevent transprosthetic bleeding during surgery include: preclotting with autologous blood, fresh frozen plasma, platelets, or albumin, or coating the graft with fibrin glue at the time of operation. These methods have many potential drawbacks, such as persistent bleeding, incomplete or less than optimal sealing, thromboembolism and bacterial contamination. Jonas et. al. (1986) Ann. Thorac. Surg. 41 pp. 657–663; Gloviczki et. al. (1984) J. Thorac. Cardiovasc. Surg. 88 p. 253; Wooster et. al. (1985) Can. J. Surg. 28 pp. 407–409. These methods include the risk of blood transmitted diseases if homologous blood or its derivatives are used for preclotting. In addition, many of these materials are costly.

Gelatin has been used to impregnate vascular prostheses and the gelatin appeared to be rapidly reabsorbed with minimal influence on healing. However, these grafts had problems; they were brittle and their permeability easily increased after manipulation. Bascom, J. U. (1961) Surgery 50 pp. 504–512.

The use of strongly cross-linked collagen prostheses has been found to give an unacceptable increase of permeability after manipulation, and is associated with a delayed reabsorption of collagen and with prevention of capillary growth. Jonas et. al. The use of collagen coated prostheses has also been associated with problems of suspected immunological reaction, which has prevented the wide acceptance of these prostheses. Balzer et. al. (1988) Thorac. Cardiovasc. Surg. 36 pp. 351–355.

B. Gelatin-Resorcinol Adhesives

The use of a gelatin-resorcinol mixture cross-linked with a combination of formaldehyde (GRF) and occasionally glutaraldehyde (GRFG) as a tissue adhesive has been described by Tatooles and Braunwald. Tatooles, C. J. and Braunwald, N. S. (1966) Surgery 60 pp. 857–61. Braunwald et. al. demonstrated satisfactory tensile bond strength in liver and kidney tissues of dogs and favorable hemostatic effects in the aorta, atria, ventricles and lungs. Braunwald et. al. (1966) Surgery 59 pp. 1024–1030. The use of gelatin-resorcinol formaldehyde (GRF) as a tissue adhesive solution was also studied by Cooper and Falb. Cooper, C. W. and Falb, R. D. (1968) Ann. N. Y. Acad. Sci. 146 pp. 214–224; Falb, R. D. and Cooper, C. W., U.S. Pat. No. 3,438,374, issued Apr. 15, 1969.

Koehnlein and Lemperle described the effects of GRF glue on liver, skin, intestine, arteries and veins of rats as well as in dura, brain and vessels of rabbits, and concluded that GRFG glue showed applicability to bleeding surfaces, minimal histotoxicity, lasting elasticity with no calcification and relatively fast phagocytosis. Koehnlein, H. E. and Lemperle, G. (1969) Surgery 66 pp. 377–82. GRF was found to be effective as a hemostatic agent in a range of experiments performed to join the edges of skin wounds, control the hemorrhage from the heart and aorta, liver, kidney and spleen, and in other gastrointestinal and neurologic surgical procedures. Koehnlein and Lemperle; Braunwald, N. S. and Awe, W. C. (1962) Surgery 51 pp. 786–792; Tatooles and Braunwald; Bonchek, L. I. and Braunwald N. S. (1967) Ann. Surg. 165 pp. 420–424; Bonchek et. al. (1967) Surg. Gynecol. Obstet. 125 p. 1301–1306. Auvert et. al. (1975) Nouv. Presse Med. 4 pp. 733–734. GRF was also used extensively used to control bleeding in dentistry. Chauvin et. al. (1984) Actual. Odontostomatol. 145 pp. 81–93; Urbach et. al. (1978) Inf. Dent. 60 pp. 23–25.

The use of GRF glue in the treatment of aortic dissections has been examined clinically. Laurian et. al. (1977) Nouv. Presse Med. 6 p. 3221; Bachet et. al. (1979) Nouv. Presse Med. 8 p. 1421; Guilmet et. al. (1979) J. Thorac. Cardiovasc. Surg. 77 pp. 516–521. Bachet et. al. studied the use of GRF glue as an adjunct in the repair of aortic dissection, and found that GRF was non-toxic, did not increase the infection rate, and resulted in fewer aortic valves replacements, quicker hemostasis, fewer transfusions and a lower complication rate when compared to a retrospective control group. Bachet et. al. (1983) Arch. Mal. Couer 1 pp. 87–94. Guilmet et al. introduced the use of GRF in dissecting aneurysms of thoracic aorta by applying the glue between the separated layers of the dissected aortic wall, thereby obtaining reinforced proximal and distal aortic segments, followed by the safe suturing of a dacron prosthesis. Guilmet et. al. Guilmet concluded that GRF glue could be used as a valued adjunct in the management of acute aortic dissection. Guilmet, D. (1985) Ann. Cardiol. Angeiol. 34 pp. 17–20. Fabiani et. al. and Paulista et. al. reported the successful treatment of aortic dissection using only GRF and without the interposition of a vascular prosthesis. Fabiani et. al. (1989) Circulation 80 Suppl. pp. 1264–1268; Paulista et. al. (1988) Arg. Bras. Cardiol. 50 pp. 269–273.

GRF glue has been found to function best at higher pH levels. Tatooles and Braunwald; Braunwald et. al.; Koehnlein and Lemperle. The addition of sodium bicarbonate has been found to increase the efficacy of the GRF glue. Braunwald et. al. Falb and Cooper reported (col. 4, lines 68–73) that a fine sodium bicarbonate powder may be blown over GRF glue when used as a tissue adhesive in order to activate it. Falb, R. D. and Cooper, C. W., U.S. Pat. No. 3,438,374, issued Apr. 15, 1969.

SUMMARY OF THE INVENTION

The invention provides a method for the application of gelatin-resorcinol aldehyde glue to a surface, wherein a solution of gelatin-resorcinol is applied to the surface to obtain a gelatin-resorcinol coated surface. Subsequently, a solution of an aldehyde is aerosolized onto the gelatin-resorcinol coated surface. The mixture of gelatin-resorcinol and the aldehyde is then allowed to polymerize on the surface. The methods of the invention may be conveniently and efficiently used to apply gelatin-resorcinol aldehyde glue to high porosity vascular prostheses, either before or after implantation, to provide improved hemostasis. The aldehydes that may be utilized according to the methods of the invention may include formaldehyde, glutaraldehyde, or a combination thereof. In one embodiment of the invention, the gelatin-resorcinol aldehyde glue may be conveniently provided in a kit that includes (a) a first container of a gelatin-resorcinol solution and (b) a second container of a solution of an aldehyde, the second container including means for aerosolizing the aldehyde solution. The methods of the invention may be used for the application of gelatin-resorcinol aldehyde glue in a wide variety of surgical procedures.

BRIEF DESCRIPTION OF THE DRAWING

The foregoing features of the invention will be more readily understood by reference to the following detailed description taken with the accompanying drawing, in which:

FIG. 1 is an illustration of a glue application device, in accordance with one embodiment of the invention.

DETAILED DESCRIPTION OF SPECIFIC EMBODIMENTS A. General

The invention provides a method for the application of gelatin-resorcinol aldehyde glue to a surface, wherein a solution of gelatin-resorcinol is first applied to the surface, and then a solution of an aldehyde is aerosolized over the gelatin-resorcinol coated surface. The solution of gelatin-resorcinol and the aldehyde is then allowed to polymerize on the surface. The methods of the invention may be conveniently and efficiently used to apply gelatin-resorcinol aldehyde glue to high porosity vascular prostheses (HPVP), either before or after implantation in vascular tissue, to provide improved hemostasis. The aldehyde utilized, according to the methods of the invention, may include formaldehyde, glutaraldehyde, or a combination thereof. In one embodiment of the invention, the gelatin-resorcinol aldehyde glue may be conveniently provided in a kit that includes (a) a first container of a solution of gelatin-resorcinol and (b) a second container of a solution of an aldehyde, the second container including means for aerosolizing the solution of aldehyde. One embodiment of such a kit, kit 1, is illustrated in FIG. 1. The components of kit 1 include applicator 12, which is comprised of a tube 14 containing a solution 16 of gelatin-resorcinol and a plunger 15. Kit 1 also includes an aerosol spray container 13, which contains an aerosolizable solution 11 of an aldehyde such as formaldehyde or glutaraldehyde. The invention may provide methods for the convenient and rapid application of gelatin-resorcinol aldehyde glue in a variety of surgical procedures. In one embodiment, the present invention provides a method of effectively and conveniently applying gelatin-resorcinol glutaraldehyde (GRG) glue to high porosity vascular prostheses (HPVP), either before or after implantation, to improve hemostasis, as described in Examples 1 and 2 below.

B. Synthesis of Gelatin-Resorcinol Glue

The gelatin-resorcinol (G-R) glue was synthesized by adding 30 g of 275 bloom gelatin (produced by boiled collagen, Fisher Scientific, Fair Lawn, NJ) and 10 mg of resorcinol (Sigma Chemical Company, St. Louis, MO) to 40 cc of distilled water. The procedure for making the mixture was the same as described by previous authors. Cooper and Falb; Tatooles and Braunwald; Braunwald and Awe; Guilmet et al.; Koehnlein and Lemperle. The solution of gelatin and resorcinol is placed in a boiling water bath, and is stirred for 30–40 minutes. The evaporated water is then replaced and a clear, honey-like, dense and viscous mixture is obtained. The air bubbles formed during the procedure escape after storage overnight. The color of the solution changes to a dark brown, but without any alteration of its properties. The glue itself is bacteriostatic because of the presence of resorcinol and can be autoclaved, using a closed container, in order to avoid evaporative volume loss. Koehnlein and Lemperle; Vandor et. al. (1980) Zeit. Exper. Chirugie 13 pp. 43–51. The solution was rendered less viscous prior to use by warming to above 40°–50° c.

B. High Porosity Vascular Prosthesis Studies

The in Vitro and in vivo ability of gelatin-resorcinol glutaraldehyde (GRG) to improve hemostasis during implantation of high porosity vascular prostheses (HPVP) was tested as described in Examples 1 and 2 below.

In the in vitro study of Example 1, below, the efficacy of GRG to prevent leakage of the HPVP was examined. In the in vitro experiments of Example 1, the GRG glue provides less transprosthetic leakage, upon applying a water permeability test, than that of commercially available pretreated high porosity conduits. The use of the G-R glue according to the methods of the invention, resulted in an almost waterproof graft, regardless of the porosity or type of fabric.

In the in vivo study of Example 2, below, the prostheses were prepared similarly to the procedure of Example 1, except that the animals were divided in three groups each of three animals as follows: Group 1: one segment of each prosthesis was installed after glue pretreatment; Group 2: the prosthesis was installed untreated and then coated after anastomosis; Group 3: the prosthesis installed was pretreated and the anastomosis was performed with largely spaced stitches in order to evaluate the ability and efficiency of the glue on sealing an imperfect anastomosis.

In the in vivo experiments of Example 2, no leaking was observed in either groups 1 or 2, using either pretreated grafts or untreated grafts, using the GRG application methods of the invention. In group 1, Example 2, treating the HPVP with GRG glue before implantation provides the advantages of (1) the ability to evaluate the water permeability before installation, (2) a decrease in the aortic cross-clamping time, and (3) the ability to completely wash off the excess aldehyde. Coating the prosthesis after implantation (group 2 of Example 2) is slightly more difficult but produces the same results as in group 1. The advantage of coating the prosthesis after implantation is the ability to coat the conduit and the anastomosis at the same time, but it is counteracted by the difficulty of spreading the glue uniformly and of completely washing the aldehyde away from the prosthesis and the surrounding tissue. The results of group 3 of Example 2 indicated that while no glue can obviate a technically poorly performed anastomosis, the use of the glue could reduce the bleeding in the case of an anastomosis performed in friable or severely altered aortic tissue such as atherosclerotic tissue or a dissecting aneurysm, where sometimes the necessity of additional stitches can further weaken the aortic wall with undesirable consequences.

C. Advantages of GRG

The GRG tissue adhesive may be utilized as a sealant for vascular grafts in a broad variety of surgical applications. The GRG may also be packaged such that it is simply used and effectively applied. The GRG compound is relatively inexpensive to produce and is not limited in terms of its sources for production and the glue carries a low risk of bacterial contamination, because of the bacteriostatic power of resorcinol and glutaraldehyde. Gelatin-resorcinol-aldehyde glue has long been used clinically and its characteristics have been extensively tested in different organs in research animals. Tatooles and Braunwald; Braunwald and Awe; Koehnlein and Lemperle; Bonchek and Braunwald. The safety of gelatin has been established by the relative inertness of the gelatin sponge as hemostatic agent and of gelatin intravenously administered as a plasma expander, both clinically used for many years. The GRG glue provides freedom from blood component constituents, unlike the blood derived, fibrin products currently used as hemostatic agents, which are source limited (and therefore often expensive), and have the risk of bloodborne disease transmission.

D. G-R Glue Application

According to the methods of the invention, gelatin-resorcinol (G-R) glue may be applied to prevent blood loss at the time of the insertion of a high porosity vascular prosthesis. The gelatin-resorcinol is applied before applying the aldehyde so that cross-linking will take place primarily on the outer part of the coating and the aldehyde is applied as an aerosol spray. This permits the glue to penetrate deeply between the weaves before cross-linking for better anchorage of the prosthesis. It was also found helpful to wash the prosthesis with warm (60°-70° C.) water or saline just before application.

The rationale of applying the aldehyde first, described by previous authors, in order to obtain a tissue hemostatic agent, is that this fixative has to cross-link with the tissue proteins before reacting with the appropriate sites of G-R, to bond the glue to the tissue. However, using the Dacron synthetic tissue, this biochemical process does not happen because there are no proteins in the Dacron. When the directions of previous published reports on use of the GRF were followed, the interaction between the glue and the prosthetic weaves was too weak.

The glue was tested with different concentrations of glutaraldehyde, to find the lowest concentration still able to give good cross-linking in 20 seconds. A completely waterproof prosthesis was obtained using 25% glutaraldehyde for 20 sec. The length of time was chosen because, when the glue is applied during arterial cross-clamping, the whole procedure cannot take more than 2-3 minutes, and the longer the exposure, the stronger the cross-linking. Thus, depending upon the context, other aldehyde concentrations and polymerization times are possible. The prosthesis was coated on the outside of the wall to obtain stronger cross-linking in the coating in the outer part of the wall. This potentially allows the sealant to be easily removed by the macrophages of the surrounding tissue, and preserves the appearance of the interstices of the inner side of the conduit, in order to obviate the poor adhesion of neointima encountered with high porosity vascular prostheses that are collagen coated on the inside of the conduit. Jonas et. al.

EXAMPLES

Example 1: In Vitro Experiments

Three different brands of 7 mm diameter segment bifurcated type HPVP were used: (1) Woven dacron prosthesis Ochsner 500 (Intravscular Inc., Clearwater, FL), water permeability: 490 ml/min/cm$^2$, size 14×7; (2) USCI DeBakey Vascoulour II (C. R. Bard Inc., Billerica, MA), water permeability: 1500 ml/min/cm$^2$; (3) Triaxial Knitted Dacron, (Vascutek Limited, Renfrewshire, Scotland), water permebility: 750 ml/min/cm$^2$.

Three samples of each type HPVP were tested. From the branches of the 14×7 bifurcated graft three segments 6 cm in length were cut. The prosthesis was wet with warm water (40°-50° C.) and then approximately 1 cc of G-R glue, prepared and warmed to about 40°-50° C. as described above, per 10 cm$^2$ of area was applied on the prosthesis and spread uniformly on its outer surface. An aqueous solution of 25% glutaraldehyde, approximately 0.5 cc per 10 cm$^2$ of area of tissue prosthesis, was then aerosolized onto the G-R coated prosthesis and allowed to react with the gelatin-resorcinol (G-R) compound for 20 seconds. The coated prosthesis was then washed with water or saline in order to remove the excess aldehyde.

Before the evaluation of water leakage, the vascular grafts were physically manipulated by clamping obliquely five times along the full length and by making two 360 degree twists in opposite directions according to Jonas et al. The water permeability was tested on a hydropneumatic device and expressed as ml/min/cm$^2$ of conduit area at the pressure of 120 mm Hg. The flexibility and the conformability were subjectively evaluated by stretching and twisting the conduits.

The results of the in vitro evaluation were as follows: The coated grafts at macroscopic observation were slightly more stiff than the identical but uncoated graft, nevertheless the characteristics of conformability and flexibility still remained excellent. The color of the graft was a light brown. The leakage at the water pressure test before and after manipulation was not measurable (less than 0.2 cc/min/cm$^2$ at 120 mm Hg), resulting in an almost waterproof graft, regardless of the porosity or type of fabric. The untreated grafts leaked as expected.

Example 2: In Vivo Experiments

Three different brands of 14 mm diameter segment bifurcated type HPVP were used: (1) Woven dacron prosthesis Ochsner 500 (Intravascular Inc., Clearwater, FL), water permeability: 490 ml/min/cm$^2$, size 14×1; (2) USCI DeBakey Vascoulour II (C. R. Bard Inc., Billerica, MA), water permeability: 1500 ml/min/cm$^2$; (3) Triaxial Knitted Dacron, (Vascutek Limited, Renfrewshire, Scotland), water permeability: 750 ml/min/cm$^2$.

The application of the GRG glue was according to following procedures: The prosthesis was wet with warm water (40°–50° C.) and then approximately 1 cc of G-R glue, prepared and warmed to about 40°–50° C., as described above, per 10 cm$^2$ of area was applied on the prosthesis and spread uniformly on its outer surface. An aqueous solution of 25% glutaraldehyde, approximately 0.5 cc per 10 cm$^2$ of area of tissue prosthesis, was then aerosolized onto the G-R coated prosthesis and allowed to react with the gelatin-resorcinol (G-R) compound for 20 seconds. The coated prosthesis was then washed with water or saline in order to remove the excess aldehyde.

Nine pigs, weighing between 35 and 45 kg, underwent anesthesia and surgery. All animals received humane care in compliance with the "Principles of Laboratory Animal Care" formulated by the National Society for Medical Research and the "Guide for the Care and Use of Laboratory Animals" prepared by the National Academy of Sciences and published by the National Institutes of Health (NIH Publication No. 80-23, revised 1978). A segment of approximately 5 cm in length, derived from the 14 mm diameter part of each bifurcated HPVP, was implanted in the descending thoracic aorta of the heparinized pigs. The anastomoses were performed with running 5–0 polypropylene suture.

The animals were divided into three groups each of three animals as follows: Group 1: one segment of each prosthesis was installed after glue pretreatment, Group 2: the prosthesis was installed untreated and then coated after anastomosis, Group 3: the prosthesis installed was lo pretreated and the anastomosis was performed with largely spaced stitches in order to evaluate the ability and efficiency of the glue on sealing an imperfect anastomosis. After release of cross-clamping, leakage (in the presence of heparization), handling and macroscopic surgical characteristics were observed and recorded.

The results of the in vivo evaluation were as follows: After the release of aortic cross-clamping, no bleeding was observed on the heparinized pigs in groups 1 and 2. In group 3, after releasing the clamp, there was a significant oozing of blood through the widely spaced stitches of the anastomosis. After reclamping and application of the glue along the suture line, a noticeable reduction of the leakage was observed. The pretreated prosthesis itself, used in this group, did not leak.

The average time to perform the anastomosis alone was about the same in treated (group 1) and untreated (group 2) prosthesis (i.e. 20 min), but the average of the total cross-clamp time in group 2 was about 2 min longer than group 1, in order to permit the coating of the prosthesis. In general, there were no discernable differences in handling and suturing characteristics between the coated and uncoated high porosity prosthesis. Using the methods of the invention, in Groups 1 and 2, no leakage occurred upon implantation of the high porosity vascular prostheses.

What is claimed is:

1. A method for the application of gelatin-resorcinol aldehyde glue to a biological tissue surface, comprising:
   (i) applying a solution of gelatin-resorcinol to the surface to obtain a gelatin-resorcinol coated surface using a kit including a first container of a solution of gelatin-resorcinol and a second container of a solution of an aldehyde, the second container including means for aerosolizing the solution of aldehyde;
   (ii) aerosolizing a solution of an aldehyde onto the gelatin-resorcinol coated surfaced wherein the aldehyde is an aqueous solution of approximately 25% glutaraldehyde and
   (iii) allowing the mixture of gelatin resorcinol and the aldehyde on the surface, obtained in step (ii), to polymerize.

2. A method according to claim 1, wherein step (iii) includes the steps of
   (a) allowing the mixture to polymerize for not more than approximately 30 seconds; and
   (b) rinsing the surface, immediately after step (a), with an aqueous solution to remove the excess aldehyde.

3. A method for the application of gelatin-resorcinol aldehyde glue to a graft, comprising:
   (i) obtaining a graft;
   (ii) applying a solution of gelatin-resorcinol to the graft, obtained in step (i), to obtain a gelatin-resorcinol coated graft;
   (iii) aerosolizing a solution of an aldehyde onto the coated graft, obtained in step (ii), to obtain a gelatin-resorcinol aldehyde mixture on the graft;
   (iv) allowing the mixture on the graft, obtained in step (iii), to polymerize.

4. A method according to claim 3, further comprising, before step (ii), the step of obtaining a kit including a first container of a solution of gelatin-resorcinol and a second container of a solution of an aldehyde, the second container including means for aerosolizing the solution of aldehyde, and
   wherein steps (ii) and (iii) are conducted using the first and second containers respectively.

5. A method according to claim 3, wherein the graft, obtained in step (i), is a high porosity vascular prosthesis; and
   wherein the method further comprises, after step (iv), the step of:
   (v) implanting the prosthesis in a vascular tissue; and
   wherein, in step (v), a prosthesis with improved hemostasis after implantation is obtained.

6. A method according to claim 5, further comprising, before step (ii), the step of obtaining a kit including a first container of a solution of gelatin-resorcinol and a second container of a solution of an aldehyde, the second container including means for aerosolizing the solution of aldehyde, and
   wherein steps (ii) and (iii) are conducted using the first and second containers respectively.

7. A method according to claim 5, wherein the aldehyde solution includes one or more aldehydes selected from the group consisting of glutaraldehyde and formaldehyde.

8. A method according to claim 7, wherein the aldehyde solution is an aqueous solution of approximately 25% glutaraldehyde.

9. A method according to claim 8, wherein step (iv) includes the steps of:
   (a) allowing the mixture to polymerize for not more than approximately 30 seconds; and
   (b) rinsing the graft, immediately after step (a), with an aqueous solution to remove the excess aldehyde.

10. A method according to claim 7,
   wherein step (i) further comprises the steps of:
   (a) obtaining a high porosity vascular prosthesis; and
   (b) implanting the prosthesis, obtained in step (a), in a vascular tissue, to obtain a graft that includes an anastomosis; and
   wherein, in step (iv), an implanted prosthesis with improved hemostasis is obtained.

11. A method according to claim 10, further comprising, before step (ii), the step of obtaining a kit including a first container of a solution of gelatin-resorcinol and a second container of a solution of an aldehyde, the second container including means for aerosolizing the solution of aldehyde, and
   wherein steps (ii) and (iii) are conducted using the first and second containers respectively.

12. A method according to claim 10,
   wherein the aldehyde solution includes one or more aldehydes selected from the group consisting of glutaraldehyde and formaldehyde.

13. A method according to claim 12, wherein the aldehyde solution is an aqueous solution of approximately 25% glutaraldehyde.

14. A method according to claim 13, wherein step (iv) includes the steps of:
   (a) allowing the mixture to polymerize for not more than approximately 30 seconds; and
   (b) rinsing the graft, immediately after step (a), with an aqueous solution to remove the excess aldehyde.

15. A method according to claim 3,
   wherein the aldehyde solution includes one or more aldehydes selected from the group consisting of glutaraldehyde and formaldehyde.

16. A method according to claim 15, wherein the aldehyde solution is an aqueous solution of approximately 25% glutaraldehyde.

17. A method according to claim 16, wherein step (iv) includes the steps of:
   (a) allowing the mixture to polymerize for not more than approximately 30 seconds; and
   (b) rinsing the graft, immediately after step (a), with an aqueous solution to remove the excess aldehyde.

18. A kit, for the application of gelatin-resorcinol aldehyde glue to a surface, comprising:
   (i) a first container including a solution of gelatin resorcinol; and
   (ii) a second container including a solution of an aldehyde and means for aerosolizing the solution of aldehyde wherein the aldehyde solution includes at least one aldehydes selected from the group consisting of formaldehyde and approximately 25% glutaraldehyde in an aqueous solution.

* * * * *